Patented July 6, 1926.

1,591,714

UNITED STATES PATENT OFFICE.

HERBERT W. LOW AND SENA C. WILLIAMS, OF OAKLAND, CALIFORNIA.

METHOD FOR MAKING PASTEURIZED BUTTER OR OLEOMARGARINE FROM SUITABLE FATS.

No Drawing.      Application filed July 2, 1923. Serial No. 649,153.

Our invention relates to the manufacture of so-called "renovated" butter and oleomargarine.

It is also a process for thoroughly mixing and blending different lots of butter which may, or may not be, to the legal standards of composition, for the purpose of obtaining one mass of butter uniform in color, texture, salt and flavor, and at the same time meeting the legal requirements of pasteurization. By the invention we secure the further result that the blended, or re-made, product has a refreshed flavor and renewed keeping quality. The process is adapted to the pasteurizing of butter which, in its original form, did not meet the legal requirements of pasteurization, and also for making commercial creamery butter from pure milk fat or butter oil.

In general, the process consists in mixing together whole milk or skimmed milk, or butter milk, and butter or butter oil, or in the case of oleomargarine a combination of vegetable or animal fats in a vat, the contents of which are agitated and heated. This vat may be heated by suitable coils, through which hot water is circulated. It is preferred that during this original heating process there should be no direct steam in contact with the mixture. In order to offset water in butter to be repasteurized, the addition of powdered skimmed milk or evaporated skimmed milk has been found advantageous.

The principle of our process is to make this mixture into a natural cream and then churn the same in the identical manner that ordinary cream is churned into commercial butter.

To accomplish this, the mixture of butter, or other fats and milk must be transformed into an emulsion from which the fat does not separate or "oil off" from the milk, and yet the emulsion must not have the fat in such small globules that the same will not be affected by the churning process. It is necessary that in making the emulsion the fat globules be of substantially the size in ordinary cream so that in the churning there will not be undue loss of butter fat due to the minute globules not churning into butter. We may form the emulsion of the mixture of milk and fats by various mechanical ways of emulsification now used by adapting them to our special requirements.

We prefer to accomplish this emulsification by passing the mixture in a continuous stream, to which stream is supplied steam at a pressure of approximately 70-lbs. more or less. We have found that while this last step may be accomplished by various means, a modified form of an ordinary steam ejector is preferred. The mixture after this treatment is then cooled quickly and without contact with the air, in order to bring the temperature down below that at which oxidization of the fat will take place. From this point the emulsion is handled the same as when making butter from ordinary cream. It is conducted to suitable vats and cooled, or ripened, and churned in the ordinary way, color being added if desired at this stage. The salt that was originally in the butter passes off in the butter milk, and fresh salt to the extent desired is added. By the above process, butter of otherwise high grade, which may have excess salt or water, or which may be leaky or brittle, or of mealy texture, or which may be streaky, too light or too high in color, may be re-made into a marketable product.

Also so-called "renovated" butter may be made by starting with purified melted butter oil in warm liquid condition with any of the above-mentioned ingredients. Likewise oleomargarine may be made by combining any fats or oils desired into a product similar to butter.

Our invention may be illustrated by one specific example of this process, it being of course understood that we do not intend to be limited thereby. This specific process consists in mixing whole or skimmed milk with milk fat in the proportion of about 35 to 40 per cent fat and 60 to 65 per cent milk, and then heating to 125 degrees F. in a vat provided with a water jacket or circulating coil through which hot water can be pumped, the mixture being stirred continually by any suitable agitating device. The mixture, then at 125 degrees F., is drawn in a continuous stream through a suitable passage into which steam is injected at a pressure of approximately 70 pounds. This has the mechanical effect of dividing the fat into fine globules of uniform size about the same as they exist in natural cream, and resulting in a product that for all practical purposes is cream, and at the same time it heats the mixture to about 185 degrees F., thus thoroughly pasteurizing the same. The cream is then passed directly through a cooling device, which may be a coil mounted in a suitable refrigerator and which is so constructed as to exclude the air until the temperature of the cream is reduced below 150 degrees F. From this point it may be cooled in an open vat, and by bringing it down to a proper temperature may be churned into butter the same as ordinary cream, and by use of the same apparatus. Care must be used in applying steam when making the emulsion that none of the fat is broken into extremely fine globules, for the reason that it will not churn into butter and will accordingly be lost. It will be noted that our process forms a rich cream in which the temperature in the emulsifying is only that required for pasteurizing, and does not change the form of or coagulate the albumen of the milk. Moreover, the fat is not reduced to minute globules but is left in a form found in natural cream, so that it will readily form into butter when churned. Our pasteurization is by the flash method and does not hold the milk and fat mixture at a high temperature long enough to coagulate the albumin, or if so only such as is found in pasteurizing operations. If milk is held at temperatures of 175° F to 185° F for a length of time it will cause some coagulation of the albumin; and temperatures of 212° F will also cause coagulation of the casein. If there is some acidity in the milk the coagulation of the albumin takes place at relatively low pasteurizing temperatures. Our process, while breaking up the fat does not form particles too small to allow exhaustive churning. In the claims where we use the term "exhaustive churning" we mean the recovery of substantially all the fats to an extent accomplished in churning natural cream.

In the claims where we use the term "milk", we mean any of the various products which come under the general classification of milk; namely, cream, sweet milk, sour milk, whole milk, skim milk, butter milk, condensed milk of all kinds and milk powder, used separately or in various practical combinations as a vehicle for butter, butter oil, vegetable or animal fats throughout our blending, mixing, pasteurizing and churning operations.

We claim:

1. The process which comprises passing a premade mixture of a body of milk and suitable fats in a warmed condition in a continuous stream, into which is injected high-pressure steam to thereby emulsify the mixture without coagulating the albumen of the milk or breaking the fat into such minute globules as to prevent exhaustive churning.

2. The process which comprises intimately mixing milk with suitable fats, heating and agitating the body of the mixture, passing the same into a continuous stream, into which high-pressure steam is injected to emulsify and pasteurize the mixture without coagulating the albumen of the milk or breaking the fat into such minute globules as to prevent exhaustive churning.

3. The process which comprises intimately mixing milk with suitable fats, heating and agitating the body of the mixture, passing the same into a continuous stream, into which high-pressure steam is injected, without coagulating the albumen of the milk or breaking the fat into such minute globules as to prevent exhaustive churning, and cooling the resultant emulsion.

4. The process which comprises mixing milk with suitable fats, heating and agitating the mixture without direct contact with the steam, passing said mixture into a continuous stream, introducing high-pressure steam into the said stream to uniformly emulsify the mixture, without coagulating the albumen of the milk or breaking the fat into such minute globules as to prevent exhaustive churning and cooling the mixture.

5. The process which comprises mixing milk with suitable fats, heating and agitating the body of the mixture until it is warmed to a temperature of at least 120 degrees F., passing the mixture into a continuous stream, introducing steam at about 70-lbs. pressure into the stream whereby the mixture is heated to approximately 185 degrees F., and cooling the mixture while excluding the air to 150 degrees F., or lower.

6. The process of making butter, which consists in taking butter and milk in the proportions of about 35% to 40% of butter and 65% to 60% of milk to make a cream, in heating and agitating the mixture, emulsifying the mixture by injection of steam into a continuous stream thereof and heating to a pasteurizing temperature without substantially coagulating and precipitation of the albumin in the milk or breaking the fat into such minute globules as to prevent exhaustive churning, cooling the mixture and churning into butter.

7. The process of making butter comprising taking butter and milk in the proportions of about 35% to 40% butter to 65% to 60% milk to make a cream, heating and agitating the mixture until it is warmed to a temperature of at least 120° F., passing the mixture into a continuous stream, introducing steam at about 70 pounds pressure into the stream whereby the mixture is heated to approximately 185° F. thereby forming an emulsion and pasteurizing without breaking the fat globules into such minute particles as to prevent exhaustive churning, cooling the mixture while excluding air to about 150° F. or lower and finally churning into butter.

8. The method of emulsifying and pasteurizing in one continuous operation various mixtures of butter, butter oil, vegetable or animal fats combined with milk which consists in warming and agitating the mixture, in passing the same in a continuous stream, in introducing into the stream steam under pressure bearing relation to the volume so as to heat the mixture to pasteurizing temperature and at the same time to emulsify the fat therein, and in cooling the mixture thereafter according to known methods.

In testimony whereof we affix our signatures.

HERBERT W. LOW.
SENA C. WILLIAMS.